(No Model.) 2 Sheets—Sheet 1.
W. H. & E. H. BRISTOL.
BOURDON PRESSURE GAGE.
No. 514,256. Patented Feb. 6, 1894.
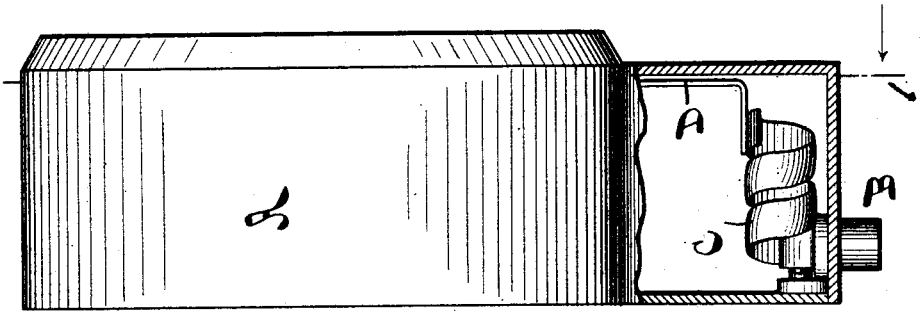
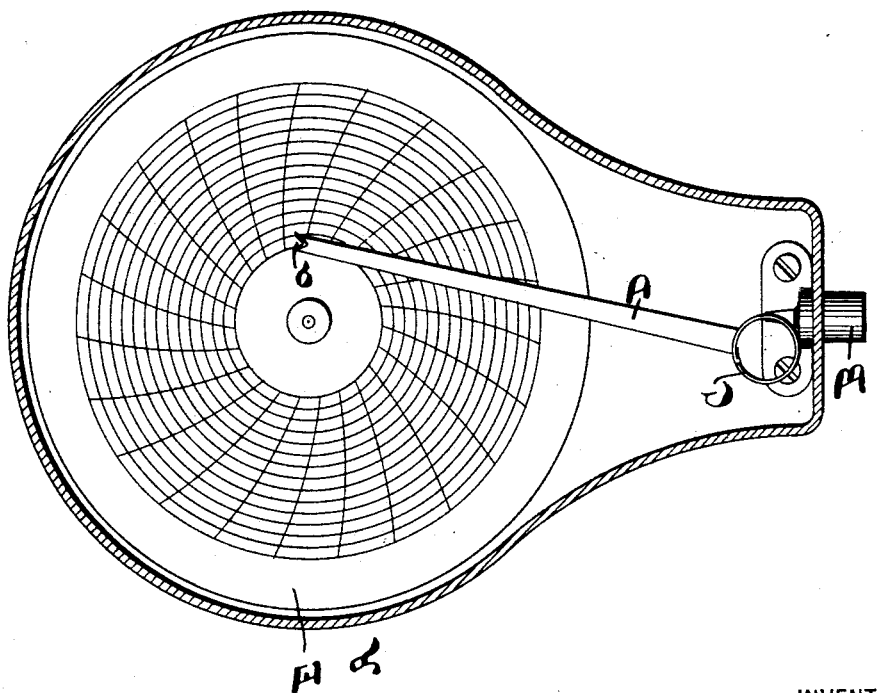
WITNESSES:
INVENTORS:
Edgar H. Bristol
William H. Bristol
BY
A. Faber du Faur
ATTORNEY (No Model.)  2 Sheets—Sheet 2.
W. H. & E. H. BRISTOL.
BOURDON PRESSURE GAGE.
No. 514,256. Patented Feb. 6, 1894.
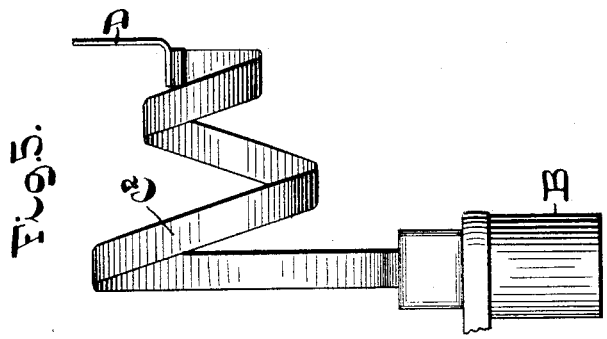
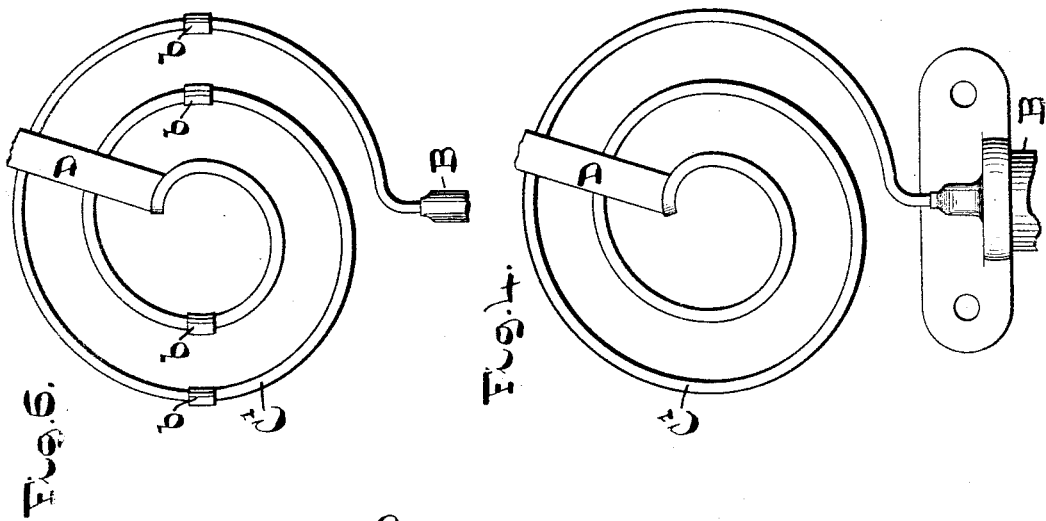
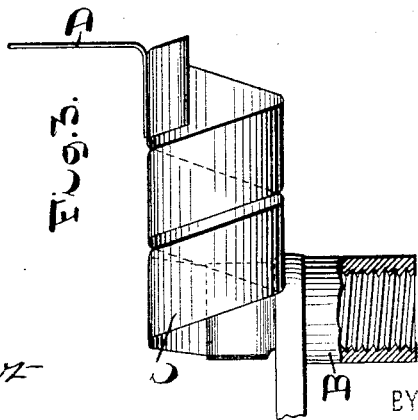
WITNESSES:
INVENTORS:
Edgar H. Bristol,
William H. Bristol
BY
A. Faberdukaurf.
ATTORNEY

UNITED STATES PATENT OFFICE.

WILLIAM H. BRISTOL, OF HOBOKEN, NEW JERSEY, AND EDGAR H. BRISTOL, OF NAUGATUCK, CONNECTICUT.

BOURDON PRESSURE-GAGE.

SPECIFICATION forming part of Letters Patent No. 514,256, dated February 6, 1894.

Application filed June 10, 1893. Serial No. 477,202. (No model.)

*To all whom it may concern:*

Be it known that we, WILLIAM H. BRISTOL, of Hoboken, in the county of Hudson and State of New Jersey, and EDGAR H. BRISTOL, of Naugatuck, in the county of New Haven and State of Connecticut, both citizens of the United States, have invented certain new and useful Improvements in Pressure-Gages, of which the following is a specification.

Our invention has for its object the production of a pressure indicator or recorder in which the movement due to variations in pressure shall be positive and certain and of such range or extent that the usual devices for multiplying the movement may be dispensed with,—and also to provide a gage which can be manufactured at low cost and is not liable to get out of order in use.

The essential feature of our present invention consists in a spring for pressure gages formed of a metallic tube of flattened cross-section formed into a series of convolutions. The spring is secured at one end, and placed at this end in communication with the inlet nipple of the gage,—while to its free end is directly attached an indicating or recording arm of any suitable form. The convolutions may be of such nature as to form either a helix, a spiral, a volute or other curved structure which will produce the desired extent of movement for the indicating or recording arm.

The nature of our said invention will best be understood when described in connection with the accompanying drawings, in which—

Figure 1 represents a vertical section on the line 1—1, Fig. 2, of a recording pressure gage embodying our improved spring. Fig. 2 is an end elevation of the same, partly in section. Fig. 3 is a side elevation, on an enlarged scale, of the helical spring detached. Fig. 4 is a face view of a spiral spring. Fig. 5 is a side elevation of a volute spring. Fig. 6 shows a spiral spring built up of sections of tubing.

Similar letters of reference indicate corresponding parts throughout the several views of the drawings.

In the drawings, referring at present to Figs. 1 and 2, the letter A designates a suitable casing for containing the operative parts of a pressure recording gage, and B is the inlet nipple.

C is the spring, consisting of a metallic tube of flattened cross-section formed into a helix. One end of this helical spring is secured to the nipple B. To the free end or terminal of the spring is directly attached, at substantially right angles to the axial line thereof, by soldering or otherwise, a recording arm D, the upper end of which is provided with a suitable ink style $a$ (or pencil) arranged to bear upon the rotating chart E.

In Fig. 4, we have shown the spring C' formed by a flattened tube wound into the form of a spiral, and an indicating or recording arm attached to its inner end.

Fig. 5 shows the tube bent to form a volute spring $C^2$. The number of convolutions in each case will depend upon the uses to which the gage is to be put, and the range of movement desired. Any number of convolutions from two up may be used.

By extending the spring through two or more complete convolutions we are able to obtain sufficient movement at the end of the spring to dispense with multiplying devices.

Any one of the springs described may be considered as a series of Bourdon springs or tubes connected end to end to concur in action, and consequently the combined movement of the component springs under pressure will be communicated to the free end or terminal of the structure and impart to the same an axial rotation through an angle corresponding substantially to the movements of the several convolutions taken collectively.

Instead of forming the spring from a continuous tube, the same may be built up in sections as shown in Fig. 6. In this figure the adjacent or contiguous ends of the several sections are shown united by suitable sleeve couplings $b$ soldered to the sections.

Of course it is to be understood that our invention may be equally well embodied in barometers, thermometers, or other analogous instruments in which either the direct influence of a pressure, such as that of the atmosphere, or that of an expansible body when exposed to varying temperatures, is the cause of operation.

What we claim as new, and desire to secure by Letters Patent, is—

1. In a pressure gage, the combination of a spring formed of a tube of flattened cross-section wound into a series of convolutions, a dial, and an indicating or recording arm attached directly to the free end of said tube, and projecting at right angles therefrom to participate in its movements, and arranged in front of said dial, substantially as set forth.

2. In a pressure gage, the combination of a spring formed of a tube of flattened cross-section wound into substantially helical convolutions open at one end for communication with the vessel under pressure, a dial, and an indicating or recording arm attached directly to the free end of said tube, and projecting at right angles therefrom to participate in its movements and arranged in front of the dial, substantially as set forth.

In testimony that we claim the foregoing as our invention we have signed our names, in presence of two witnesses, this 3d day of June, 1893.

WILLIAM H. BRISTOL.
EDGAR H. BRISTOL.

Witnesses:
JAMES G. HALLAS,
GEO. C. NUTTALL.